UNITED STATES PATENT OFFICE.

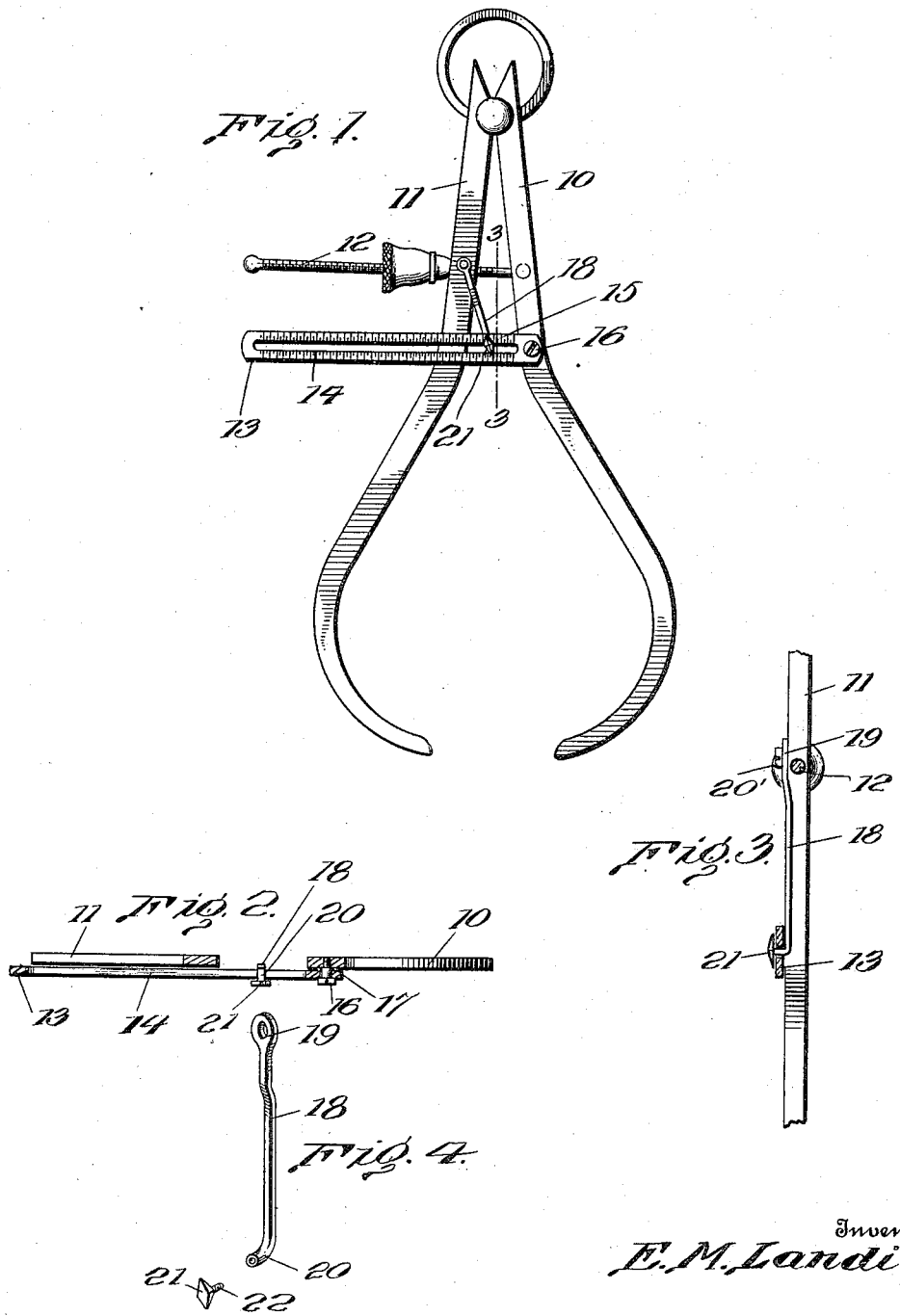

EARL MILES LANDIS, OF NEW KENSINGTON, PENNSYLVANIA.

SCALE ATTACHMENT FOR MEASURING INSTRUMENTS.

1,175,457.

Specification of Letters Patent.

Patented Mar. 14, 1916.

Application filed April 21, 1915. Serial No. 22,842.

*To all whom it may concern:*

Be it known that I, EARL M. LANDIS, a citizen of the United States, residing at New Kensington, in the county of Westmoreland and State of Pennsylvania, have invented certain new and useful Improvements in Scale Attachments for Measuring Instruments, of which the following is a specification.

This invention contemplates an improved scale attachment for measuring instruments, being particularly designed for use upon calipers and has as its primary object to provide a construction wherein measurements by the calipers will be mechanically and accurately indicated upon the scale.

The invention has as a further object to provide an improved construction which may be readily used in connection with any conventional type of caliper with the necessity of but slight structural change therein. And the invention has as a still further object to provide a construction which will be simple and which, in use, will prove entirely efficient.

Other and incidental objects will appear as the description proceeds and in the drawings wherein I have illustrated the preferred embodiment of the invention and wherein similar reference characters designate corresponding parts throughout the several views, Figure 1 is a side elevation showing a caliper equipped with my improved scale attachment, Fig. 2 is a transverse sectional view showing the mounting of the scale bar employed, Fig. 3 is a fragmentary sectional view taken on the line 3—3 of Fig. 1 and more particularly showing the mounting of the indicator arm arranged to coact with the scale bar, and Fig. 4 is a detail perspective view showing the indicator arm detached.

While I have indicated that my improved scale attachment is especially designed for use upon calipers, still, it will be seen, as the description of the invention proceeds, that the construction may be employed in connection with almost any type of measuring instrument having pivotally connected coacting legs and I do not, therefore, wish to be limited in this regard. However, in the drawings, I have shown the invention applied to a conventional type of calipers having pivotally connected legs 10 and 11 respectively which are operable either toward or away from each other by a set screw 12 of the usual type.

Mounted upon the leg 10, upon one side thereof and at a point intermediate its ends, is a scale bar 13 which is formed with a longitudinal slot 14 throughout the major portion of its length and is provided with a suitable scale 15. The bar 13 is, as will be observed, preferably flat and is pivotally connected, at one end, with the leg 10 by a screw 16 or other suitable pivot pin. The screw 16 extends freely through a suitable bore formed in the bar 13 and interposed between the bar and the leg 10 is a washer 17 best shown in Fig. 2 of the drawings, the washer being freely mounted upon the screw 16. By this arrangement, it will be observed that the bar is adapted to swing freely upon the screw.

Mounted upon the leg 11 upon one side of and adjacent the bar 13 is an indicator arm 18 shown in detail in Fig. 4 of the drawings. The arm 18 is preferably formed from a single piece of suitable resilient material and at one end thereof, is provided with an eye 19 adapted to receive a screw 20′ for detachably and rigidly connecting the arm with the leg. At a point intermediate its ends, the arm 18 is offset to extend, at its free extremity, between the legs 10 and 11 of the caliper upon one side of and in the rear of the bar 13, and at the outer end thereof is formed with a laterally directed lug or terminal 20.

The terminal 20 of the arm 18 is preferably circular in cross-section and is adapted to be freely received within the slot 14 of the bar 13 to slide freely longitudinally therein. Detachably connected to the terminal 20, at the outer end thereof is a double ended pointer 21 adapted to coöperate with the scale 15 of the bar 13. Preferably, the terminal 20 is provided with a screw threaded bore while the pointer 21 is formed with a screw threaded shank 22 adapted to be detachably received therein, so that when desired, the several elements of the device may be readily attached to or detached from the calipers.

It will now be observed that when the legs 10 and 11 are pivotally moved either toward or away from each other, the terminal 20 of the indicator arm 18 will slide within the slot 14 of the bar 13 to coöperate with the scale 15. The scale 15 may be of any desired character and is so arranged as to accurately indicate in connection with the pointer, the distance between the free outer ends of the legs 10 and 11.

It will thus be seen that my improved attachment may be readily applied to any conventional type of measuring instrument of the general character herein indicated with the necessity of but slight structural change therein, and that in making measurements, such measurements will be mechanically indicated simultaneously with the application of the instrument to the object to be measured.

Having thus described my invention, what I claim and desire to secure by Letters Patent is:—

1. In a measuring instrument, the combination with pivotally mounted coacting legs, of a bar provided with a scale and mounted upon one of said legs, and an arm carried by the other of said legs and freely supporting the bar, the arm being provided with a pointer arranged to coöperate with the scale upon the bar.

2. In a measuring instrument, the combination with pivotally connected coacting legs, of a bar swingingly connected to one of said legs and provided with a scale, an arm rigidly mounted upon the other of said legs at a point intermediate the ends thereof and adapted to coact with the bar, and a pointer carried by said arm and arranged to coöperate with the scale upon the bar.

3. In a measuring instrument, the combination with pivotally mounted coacting legs, of a bar swingingly connected to one of said legs and having a slot formed therein, the bar being provided with a scale, an arm rigidly connected to the other of said legs and provided with a laterally directed terminal freely received in said slot, and a pointer carried by said arm and adapted to coöperate with the scale upon the bar.

4. In a measuring instrument, the combination with pivotally mounted coacting legs, of a bar pivotally mounted upon one side of one of said legs and provided with a scale, an arm rigidly mounted upon the adjacent side of the other of said legs and being offset intermediate its ends to extend upon one side of and in the rear of said bar to operatively engage the bar, and a pointer carried by the free end of said arm and arranged to coöperate with the scale upon the bar.

5. In a measuring instrument, the combination with pivotally mounted coacting legs, of a flat bar mounted upon one of said legs and provided with a scale, a pivot pin detachably and swingingly connecting the bar with the said leg, an arm mounted upon the other of said legs, means detachably and rigidly connecting the arm with said last mentioned leg, the bar having a longitudinally extending slot formed therein and the arm being formed with a laterally directed terminal freely engaging in said slot, and an indicator detachably connected to the laterally directed terminal of said arm and adapted to coöperate with the scale upon the bar.

6. A measuring instrument including coacting legs adjustable relative to each other, a bar carried by one of said legs to extend transversely between the free extremities of the legs and provided with a scale, and an arm carried by the other of said legs at a point intermediate its ends with its free extremity presented toward the free ends of the legs to coact with the scale upon the bar for indicating the relative adjustment of the legs.

In testimony whereof I affix my signature in presence of two witnesses.

EARL MILES LANDIS. [L. S.]

Witnesses:
D. L. LANDIS,
A. R. BELLEFROW.

Copies of this patent may be obtained for five cents each, by addressing the "Commissioner of Patents, Washington, D. C."